United States Patent
Peterson et al.

(10) Patent No.: US 6,988,420 B2
(45) Date of Patent: Jan. 24, 2006

(54) METHOD AND APPARATUS FOR APPLYING DYNAMIC LOADS TO A LOCKED GEAR TRAIN FOR TESTING POWER TRANSMISSION COMPONENTS

(75) Inventors: Christopher E. Peterson, Lufkin, TX (US); Curtis W. Havard, Lufkin, TX (US); Robert Guizzetti, Michelbach (FR); Kenneth O. Beckman, Lufkin, TX (US)

(73) Assignee: Lufkin Industries, Inc., Lufkin, TX (US)

( * ) Notice: Subject to any disclaimer, the term of this patent is extended or adjusted under 35 U.S.C. 154(b) by 218 days.

(21) Appl. No.: 10/716,091

(22) Filed: Nov. 17, 2003

(65) Prior Publication Data

US 2005/0103556 A1 May 19, 2005

(51) Int. Cl.
*G01L 3/02* (2006.01)
(52) U.S. Cl. .................................... 73/862.31
(58) Field of Classification Search .............. 73/862, 73/862.31, 862.191, 862.08, 862.381, 862.46, 73/862.49, 862.392
See application file for complete search history.

(56) References Cited

U.S. PATENT DOCUMENTS

| | | | | |
|---|---|---|---|---|
| 3,982,419 A | * | 9/1976 | Boys | 73/862.24 |
| 4,665,756 A | * | 5/1987 | Snyder | 73/862.21 |
| 4,918,998 A | * | 4/1990 | Periou | 73/862.326 |
| 5,992,243 A | | 11/1999 | Leeper | |
| 6,066,062 A | * | 5/2000 | Pigozzi | 475/207 |
| 6,105,439 A | | 8/2000 | Roger | |
| 6,113,513 A | * | 9/2000 | Itoh et al. | 476/10 |
| 2002/0117011 A1 | | 8/2002 | Wilks et al. | |
| 2003/0153426 A1 | * | 8/2003 | Brown | 475/210 |

OTHER PUBLICATIONS

Krzan, B., & Vizintin, J. (2003). Vegetable-based oil as a gear lubricant. Gear Technology, 28-33.
"Philadelphia Testing Facilities", p. 13. Source unknown.
"Locked Torque Test", p. 21. Source Unknown.

* cited by examiner

Primary Examiner—Harshad Patel
Assistant Examiner—T Miller
(74) Attorney, Agent, or Firm—Gary L. Bush; Andrews Kurth LLP

(57) ABSTRACT

An apparatus for testing power transmission components of a locked gear train having two helical gears coupled on a first shaft meshed with two helical pinions coupled on a second shaft, with the two gears arranged to axially translate (while rotating) with respect to the two pinions when a linear force is applied to a thrust bearing at an end of the first shaft. The axial displacement of the two gears causes torsional displacements of the meshed gear and shaft elements, creating a dynamic torque within the locked train assembly. Under rotation, this dynamic torque subjects the components within the locked gear train to a much higher power level for testing.

11 Claims, 2 Drawing Sheets

METHOD AND APPARATUS FOR APPLYING DYNAMIC LOADS TO A LOCKED GEAR TRAIN FOR TESTING POWER TRANSMISSION COMPONENTS

BACKGROUND OF THE INVENTION

1. Field of the Invention

This invention relates generally to power transmission component testing and specifically to a method and apparatus for dynamically loading a locked gear train testing rig to produce required load and speed conditions.

2. Description of the Prior Art

In the power transmission manufacturing industry, it is desirable to test transmission components such as gears, shafts, couplings, bearings, and the like at their design and maximum speed and power ratings for quality assurance purposes. Testing transmission components designed for low power applications is straight-forward, because there is an ample supply of power sources and loads available to build a complete power train testing setup. As the power levels for testing increase, both the prime movers (e.g. large electric motors, steam or gas turbines) and loads (e.g. electrical or hydraulic dynamometers) become more costly. To eliminate the need for high power sources, the power transmission manufacturing industry developed and use the locked gear train, as illustrated in FIG. 1 of the attached drawings, to test transmission components at high power and torque.

Referring to FIG. 1, a locked gear train 10 is a system including two gear units 13A, 13B of the same ratio and shaft separation. Each gear unit includes a pinion 14 with pinion shaft 16, a gear 18 with gear shaft 20, two bearings 22 per shaft, a housing 23 that supports the bearings and encloses the pinion and gear assemblies, and a lubrication system. One coupling 25 each is attached to the two pinion shafts 16, connecting a pinion connecting shaft 26 therebetween. Likewise, one coupling 24 each is attached to the two gear shafts 20, connecting a gear connecting shaft 28 therebetween. The couplings 24, 25 can be gear type, diaphragm or disk type, rigid flanged, etc. Respective gear and pinion helices are shown as having opposite hand angles, but prior art arrangements as of FIG. 1 also apply to identical hand gears of single identical sign.

A locked gear train is used to test power transmission components, because the pinions, gears, shafts, couplings, and bearings can be operated at high power levels without requiring a large power source. The theory of operation is based on torsional spring energy stored in the locked gear train. In a perfectly aligned locked train, the pinions and gears mesh easily with no undue static force from one gear element to another; the gear elements turn freely with little friction. There is no spring energy stored in an uncoupled or unloaded locked train. In a coupled or loaded locked train, when angular deflection is introduced, a static torque is induced. The active gear tooth surfaces of the pinions and gears abut tightly against each other, and the rolling friction of the system is increased. There are equal and opposite forces acting at the active pinion and gear tooth surfaces resisting the angular deflection, and there are reaction forces at the bearings holding the locked train in static equilibrium. A loaded locked train stores spring energy as torsional deflection in the locked train components.

In the prior art, static torque is intentionally induced by assembling the locked train with an angular misalignment, usually at one of the couplings. The angular misalignment must be compensated for by the introduction of a corrective angular deflection which imparts the torque to the locked train. This arrangement is referred to as a pre-torqued locked gear train. An attached motor 52 is used to rotate the pre-torqued locked gear train. When rotated, power level at the pinions, gears, shafts and couplings of the pre-torqued locked gear train is much greater than the power output of the motor, because locked gear train components are subjected to pre-torque. The motor is not required to supply much torque to achieve the high power levels required for testing. The power level at each locked gear train component is the product of the pre-torque value and the angular velocity. With a unity unit conversion factor included, the power-torque-speed relationship is:

| | |
|---|---|
| P = | cNT |
| where | |
| P = | power (H.P.) |
| N = | speed (rpm) |
| T = | torque (ft. lbs.) |
| c = | conversion factor (5252 H.P./(rpm ft. lbs.)). |

The power levels within the rotating pre-torqued gear train can far exceed the power required of the motor which rotates the locked train. In other words, the power levels at each component of the locked train is the result of the artificially induced pre-torque. This resulting power level is transmitted in a closed loop within the locked train. The motor, existing outside the locked train, is decoupled from the resulting power level of the locked gear train. The power required to rotate the pre-torqued locked gear train is only that which is required to overcome inertia and friction. The actual power required to run the test set-up for a given speed/power test is only a fraction (typically five percent or less) of that resulting power level within the locked gear train.

A power transmission component must be tested at a given power and speed. The component may be a gear, pinion, shaft, coupling, bearing, etc. The component is assembled in the locked train arrangement. Next, the required pre-torque is calculated from the power-torque-speed relationship:

$$T = \frac{P}{cN}$$

where

| | |
|---|---|
| T = | torque (ft lbs.) |
| P = | power (H.P.) |
| N = | speed (rpm) |
| c = | conversion factor (5252 H.P./(rpm ft. lbs.)) |

The required pre-torque is then applied to the locked gear train, generally by uncoupling one of the couplings 24, applying torque to a main gear connecting shaft by rotating it an angular deflection of $\Theta$ radians while holding the facing main gear shaft stationary, and then re-coupling to lock in the pre-torque. This procedure builds up torsional spring force in the locked train. The torque-angular deflection relationship is expressed by Hooke's law as:

$\Theta = -T/k$ where

| | |
|---|---|
| Θ = | angular deflection (radian) |
| T = | torque (ft. lbs) |
| k = | spring constant (ft. lbs./radian) |

The spring constant k is for the entire locked train and can be determined by appropriate modeling techniques or empirical data from experimentation. The locked train, containing the component to be tested, is then rotated at speed N, while quality control parameters are monitored.

Static torquing of the locked train has inherent difficulties. Only one torque level can be applied without uncoupling, re-torquing, and re-coupling. For each power-speed datum required, the time consuming procedure must be repeated. The static torquing method also risks damage to the bearings from static loading, and it is dangerous because of the safety hazard to test personnel when coupling and uncoupling shafts with high torsional spring energy stored in the gears.

Dynamic torquing methods have been developed which alleviate the disadvantages of the static torquing method described above. With dynamic torquing methods, the gear train is brought up to speed under no load conditions, so that the bearings can develop full film before the load is dynamically applied.

One method is to have a rotary actuator, which utilizes hydraulic force to rotate one shaft in relation to the other, applying the necessary toque. Rotary actuators have speed and torque limitations and require balancing and maintenance.

Another method employs a sliding gear on a spline, but this method has the problem of the spline seizing or sticking under high load, causing discontinuous load application, i.e. skipping or stepping.

IDENTIFICATION OF OBJECTS OF THE INVENTION

A primary object of the invention is to provide a method and apparatus for testing power train components under test load and speed conditions using a locked gear train which can be dynamically loaded and unloaded at test speed, where the load is continuously variable.

Another object of the invention is to provide a dynamically loadable locked gear train apparatus which does not require a slidable spline joint within the locked train circuit, to promote smooth continuous changes in load.

SUMMARY OF THE INVENTION

The objects identified above, as well as other features and advantages of the invention are incorporated in a method and apparatus for testing power transmission components comprising a locked gear train having two helical gears of opposite hand which are coupled on a first shaft meshed with two helical pinions of opposite hand which are coupled on a second shaft, where the two gears are arranged to axially translate while rotating under an axial force applied to a thrust bearing at an end of the first shaft. The axial displacement of the two gears causes opposite torsional displacements at each gear unit, thereby creating a torque within the locked train assembly. Under rotation at test speed, this torque subjects the components within the locked gear train to power levels far greater than that produced by the prime mover which rotates the gear train assembly. The axial force at the thrust bearing is used to vary the power level at which the components are tested. The test power level can be determined by measuring the axial force applied, the axial displacement of a gear with respect to its mating pinion, or measurement of the torque by strain gage methods.

BRIEF DESCRIPTION OF THE DRAWINGS

The invention is described in detail hereinafter on the basis of the embodiments represented schematically in the accompanying figures, in which.

DESCRIPTION OF THE PREFERRED EMBODIMENT OF THE INVENTION

Figure 2:
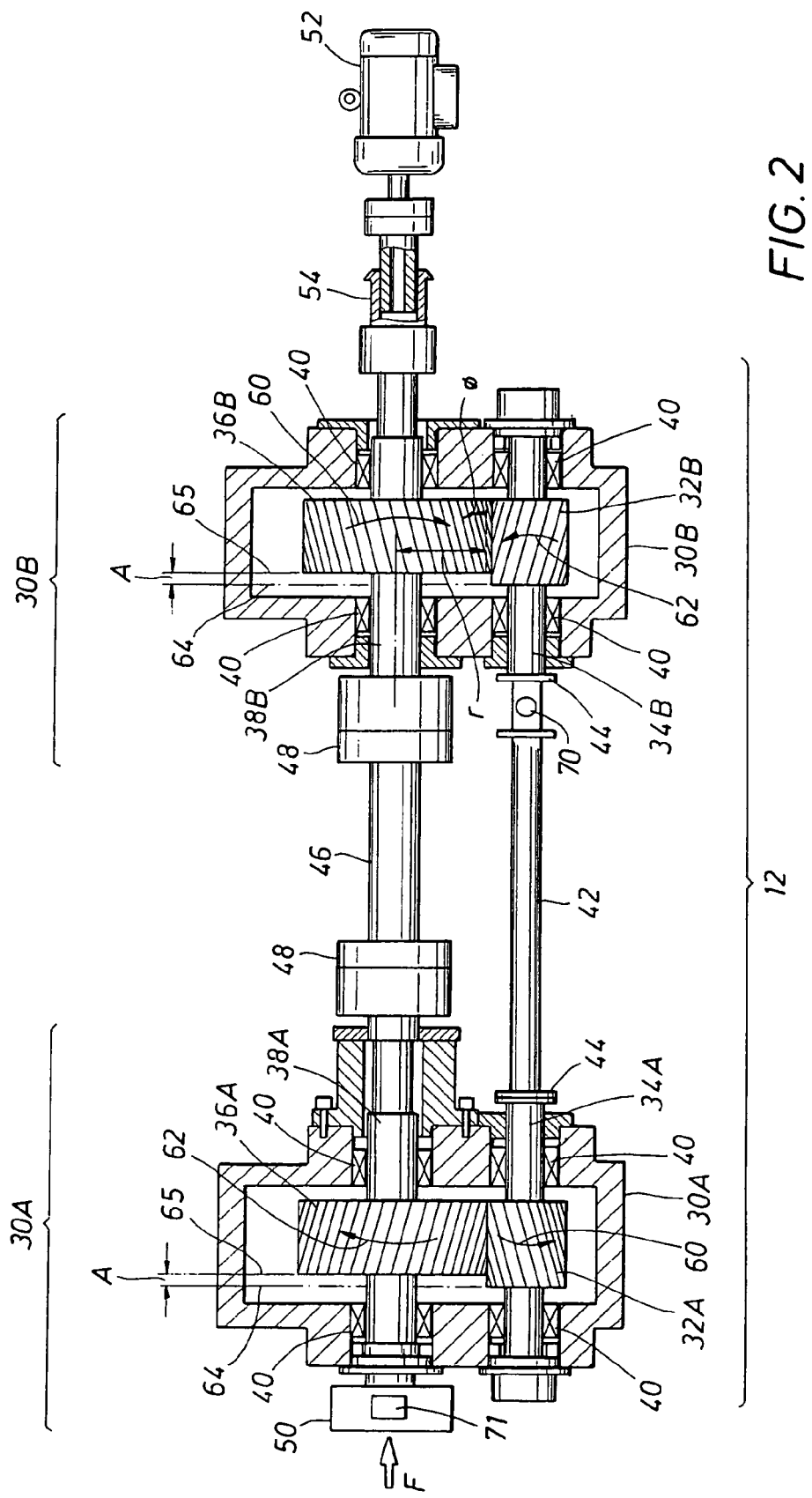
FIG. 2 illustrates a locked gear train of the present invention having single helical gearing and a thrust bearing arranged so that a linear loading force at the thrust bearing imparts axial motion to the two main gears with respect to the two pinion gears to create a torque in the locked gear train.

FIG. 2 shows a locked gear train 12 of the invention. Like prior art gear train 10, it includes two gear units 30A, 30B of the same ratio and shaft separation. The gear units include single helical pinions 32A, 32B, pinion shafts 34A 34B, single helical gears 36A, 36B, gear shafts 38A, 38B and bearings 40. Couplings 44 connect pinion shafts 34A, 34B to a pinion connecting shaft 42. Likewise, couplings 48 connect gear shafts 38A, 38B to a gear connecting shaft 46. Couplings 44 can be gear type, diaphragm or disk type, while couplings 48 must be rigid or flanged. Thrust bearing 50 is coupled to gear shaft 38A opposite the end at which gear connecting shaft 46 is coupled. Prime mover 52 is coupled to gear shaft 38B opposite gear connecting shaft 46 via spline coupling 54, which is designed to slide axially while rotating under the inertial and frictional loads of the locked gear train 12. Pinions 32A, 32B are axially longer than corresponding gears 36A, 36B. The gears 36A, 36B are designed to axially translate with respect to the pinions 32A, 32B.

To torque locked train 12, an axial force F of sufficient magnitude is applied at thrust bearing 50 to gears 36A, 36B to cause an axial displacement at each gear 36A, 36B with respect to the mating pinions 32A, 32B. FIG. 2 shows the locked train assembly 12 under a maximum force F with gears 36A, 36B displaced a maximum distance A from the no-load zero position 64 to the full-load position 65. The gears 36A, 36B move from no-load to full-load position in response to increasing levels of an applied force F. Due to the axial force imparted to the helical meshes of the two gearsets, pinion 32A and gear 36B are rotated in opposite directions (outward over the top) as indicated by arrows 60, 62, while pinion 32B and gear 36A are simultaneously rotated in opposite directions (inward over the top) as indicated by arrows 60', 62'. The summation of the rotational displacements of the two pinions 32A, 32B and the two gears 36A, 36B is represented as Θ radians.

An angular rotation of Θ radians in a locked gear train according to Hooke's law creates an opposing spring torque (−T) in the system. The minus sign is applied to signify that the static torque is in a direction opposing the rotation of the prime mover 52. In the prior art locked gear train 10 of FIG. 1, the spring energy is stored in the system until uncoupled. In the arrangement 12 of FIG. 2, torque is not inherently stored in the system but results from an applied force F. The spring-induced torque is translated through the helical tooth angle φ of the meshed gear teeth as shown in FIG. 2 in response to the axial force F. The relationship between the torque T and the axial force F is a simple proportion based on the helix angle φ:

$$F = \frac{-T\tan\Phi}{r} \quad \text{or,} \quad -T = \frac{Fr}{\tan\Phi}$$

where

| | |
|---|---|
| Φ = | helix angle (radian) |
| T = | torque (ft. lbs.) |
| r = | radius of the main gear (ft.) (see FIG. 2) |
| F = | axial force (lbs.). |

Similarly, the relationship between the sum of angular deflections of the two pinion gears 32A, 32B and the two main gears 36A, 36B, Θ, and the axial travel A is:

$$\Theta = \frac{A\tan\Phi}{r}$$

where

| | |
|---|---|
| Θ = | angular deflection (radian) |
| A = | axial travel (ft.) |
| Φ = | helix angle (radian) |
| r = | radius of pitch circle of the gear (ft.). |

Rearranging the angular deflection Θ and the axial travel A relationship terms from the above equation and applying Hooke's law yields:

$$-T = \frac{Ak\tan\Phi}{r} \quad \text{or,} \quad A = \frac{-Tr}{k\tan\Phi}$$

where

| | |
|---|---|
| A = | axial travel (ft.) |
| Φ = | helix angle (radian) |
| r = | radius of pitch circle of the gear (ft.) |
| T = | torque (ft. lbs.) |
| k = | spring constant (ft. lbs./radian). |

These equations hold true regardless of whether the locked gear train is spinning or not. However, to prevent operational problems inherent in statically loading the bearings, force F is applied only after the train 12 is being rotated by prime mover 52.

The above equations show that for a given locked train assembly 12 of FIG. 2, the torque and hence the power at a given speed, is purely a function of the force F applied at thrust bearing 50. Thus, the power level during testing can be determined and controlled by measuring axial force F. This force is derived from a hydraulic pressure over a piston area, or by means of load cells in the pushing mechanism. Alternatively, the power level during testing may be determined from measuring axial displacement A. Torque is a function of both axial displacement A and the spring constant of the locked train assembly. Displacement A can be determined while the shafts 46 and 42 are rotating during testing by measuring the distance from a mark 64 on the shaft to an interior surface of the main gear 36A or 36B on the pinion gear 32A or 32B. Because the spring constant of the system may vary from the calculated value and thus impact accurate power determination, a calibrated strain gauge 70 may be inserted in the locked train 12 to give a more precise determination of torque.

No splines are required between the pinion and gears in the locked gear train apparatus 12 of FIG. 2. The splines coupling 54 at prime mover 52 experience only low loading, because they are located outside the torqued locked gear train. This arrangement is advantageous compared to dynamically loadable arrangements of the prior art, wherein a single helix gear slides on splines. In such prior art arrangement, the splines are located within the locked train which is subject to high power loads. The splines must be large enough to transfer the full torque and to slide freely to allow the torque to change. Because the splines are loaded both axially and radially, they have a tendency to skip or step when required to slide under high load causing discontinuities in load application.

Figure 1:
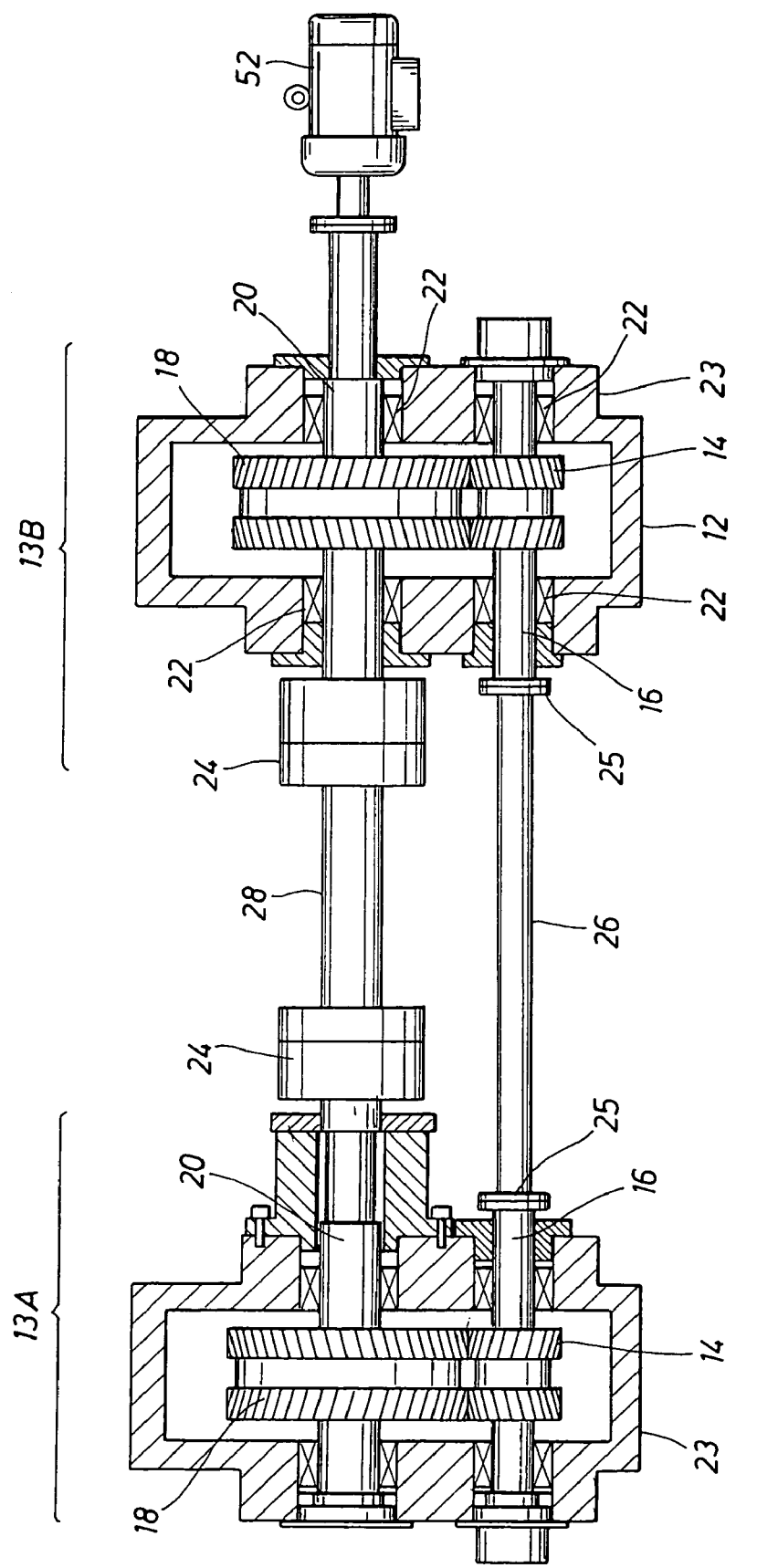
FIG. 1 illustrates a prior art locked gear train, suitable for static pre-torquing, used for testing power transmission components.

Compared with prior art statically loaded locked gear trains of FIG. 1, the arrangement of FIG. 2 is more reliable, because the bearings 40 are not statically loaded. Operator safety is enhanced, because spring energy is not stored in the arrangement. Finally, unlike statically loaded locked gear trains of the arrangement of FIG. 1, continually variable power levels are obtainable. Components are tested at operating speed and power conditions, with readily available small prime movers. The arrangement of FIG. 2 provides testing at higher speeds and torques as compared to prior art dynamically loadable locked gear trains. The arrangement is inherently balanced, and torque is applied in a smooth and continuous manner.

While the preferred embodiment of the invention has been illustrated in detail, modifications and adaptations of the preferred embodiment will occur to those skilled in the art. Such modifications and adaptations are intended to be within the scope of the invention as set forth in the following claims.

What is claimed is:

1. In combination with a locked gear train (12) having two helical gears (36A, 36B) carried on a first shaft (46) and two pinions (32A, 32B) carried on a second shaft (42), with a first pinion (32A) meshed with a first gear (36A) and a second pinion (32B) meshed with a second pinion (36B), an arrangement for testing a power transmission component comprising, a support arrangement (30A, 30B) by which the first and second gears (36A, 36B) and the first shaft (46) are free to move axially with respect to the first and second pinion gears (32A, 32B) and the second shaft (42)

a thrust bearing (50) coupled to a first end of the first shaft (46), and a prime mover (52) coupled to a second end of the first shaft (46) which applies a positive torque to the second end of said first shaft, whereby a force (F) applied axially to the thrust bearing (50) causes axial displacement (A) of the first and second gears (36A, 36B) with respect to the first and second pinion gears (32A, 32B) while establishing a negative torque in the locked gear train (12) which opposes the positive torque to produce a power level in the locked gear train greater than that produced solely by the prime mover.

2. The arrangement of claim 1 wherein,
a spline arrangement (54) couples the prime mover (52) with the second end of the first shaft (46).

3. The arrangement of claim 2 further comprising,
a measurement device by which torque applied to the thrust bearing can be determined.

4. The arrangement of claim 3 wherein the measurement device includes
a load measuring device installed in an axial force path of the first shaft (46) for measuring force F applied to the thrust bearing (50), and the torque is determined from the measurement of F by the relationship, $$-T = \frac{Fr}{\tan\Phi}, \text{ where}$$

| | |
|---|---|
| $\Phi$ = | helix angle (radian) of main and pinion gears, |
| r = | radius of the main gear (ft.) |
| T = | torque (ft. lbs.) |
| F = | axial force (lbs.). |

5. The arrangement of claim 3 wherein the measurement device includes
a displacement indicator (64) arranged and designed to measure a displacement distance A on the first shaft and wherein,
the torque is determined from the measurement of A by the relationship, $$-T = \frac{Ak\tan\Phi}{r}$$

where

| | |
|---|---|
| T = | torque (ft. lbs.) |
| A = | axial travel (ft.) |
| $\Phi$ = | helix angle (radian) |
| r = | radius of the main gear (ft.) |
| k = | spring constant (ft. lbs./radian). |

6. The combination of claim 1 wherein,
the two helical gears (36A, 36B) are of opposite hand and the two pinions are of opposite hand.

7. A method for testing a power transmission component comprising the steps of
installing the component in a locked gear train (12) having two helical gears (36A, 36B) carried on a first shaft (46) and two pinions (32A, 32B) carried on a second shaft (42), with a first pinion (32A) meshed with a first gear (36A) and a second pinion (32B) meshed with a second gear (36B), the locked gear train having a support arrangement (30A, 30B) by which the first and second gears (36A, 36B) and the first shaft (46) are free to move axially with respect to the first and second pinions (32A, 32B) and the second shaft (42),
coupling a thrust bearing (50) to a first end of the first shaft,
coupling a prime mover (52) to a second end of the first shaft,
applying an axial force to the thrust bearing (50) to cause axial displacement (A) of the first and second gears (36A, 36B) with respect to the first and second pinions (32A, 32B), which through helix angles of the gears causes an angular deflection in opposed directions in the gears thereby establishing a torque in the locked gear train (12) which upon rotation at a test speed produces a power level in the locked gear train greater than that produced solely by the prime mover.

8. The method of claim 7 whereby
the prime mover is coupled to the second end of the first shaft by a spline arrangement.

9. The method of claim 8 further comprising the steps of
installing a load measuring device in an axial force path of the first shaft (46),
applying an axial force to the thrust bearing, and determining torque to the locked gear train from the measurement of force F from the load measuring device by the relationship $$-T = \frac{Fr}{\tan\Phi}$$

where

| | |
|---|---|
| $\Phi$ = | helix angle (radian) of main and pinion gears |
| r = | radius of the main gear (ft.) |
| T = | Torque (ft. lbs.) |
| F = | axial force (lbs.). |

10. The method of claim 8 further comprising the steps of
applying an axial force (F) to the thrust bearing,
measuring axial displacement (A) of the first shaft (46) in response to said axial force (F), and
determining torque from the relationship, $$-T = \frac{Ak\tan\Phi}{r}$$

where,

| | |
|---|---|
| T = | torque (ft. lbs.) |
| A = | axial travel (ft.) |
| $\Phi$ = | helix angle (radian) |
| r = | radius of the main gear (ft.) |
| k = | spring constant (ft. lbs./radian). |

11. The method of claim 7 wherein,
the two helical gears (36A, 36B) are of opposite hand and the two helical pinions are of opposite hand.

* * * * *